United States Patent [19]

Knight

[11] 4,391,297
[45] Jul. 5, 1983

[54] MONO-RAIL BOOM SUPPORTED ARTICULATED SERVICE LINE

[75] Inventor: Houston W. Knight, Whittier, Calif.

[73] Assignee: FMC Corporation, Chicago, Ill.

[21] Appl. No.: 208,767

[22] Filed: Nov. 20, 1980

[51] Int. Cl.³ .............................................. F16L 3/00
[52] U.S. Cl. .................................... 137/615; 141/387; 166/75 R
[58] Field of Search ............. 166/75 R; 137/615, 343, 137/355.12, 355.16; 141/387, 388

[56] References Cited

U.S. PATENT DOCUMENTS

| | | | |
|---|---|---|---|
| 3,053,320 | 9/1962 | Steincomp | 166/75 |
| 3,217,748 | 11/1965 | Harper | 137/615 |
| 3,281,080 | 10/1966 | Hogg | 137/615 |
| 3,399,909 | 9/1968 | Ambrose | 137/615 |
| 3,459,222 | 8/1969 | McElroy | 137/615 |
| 3,498,325 | 3/1970 | Ashton et al. | 137/615 |
| 3,721,260 | 3/1973 | Stahner | 137/615 X |
| 3,884,528 | 5/1975 | Shaddock | 137/615 |
| 3,942,554 | 3/1976 | Werner et al. | 137/615 |
| 4,015,625 | 4/1977 | Alexander | 137/355.2 |
| 4,130,134 | 12/1978 | Castle | 137/615 |
| 4,269,239 | 5/1981 | Haley | 137/615 |

FOREIGN PATENT DOCUMENTS 456906 11/1936 United Kingdom ................ 285/168

Primary Examiner—A. Michael Chambers
Attorney, Agent, or Firm—Lloyd B. Guernsey; W. W. Ritt, Jr.; Richard B. Megley

[57] ABSTRACT

A mono-rail boom supported articulated pipe well service line for the transfer of pressurized fluids from service vehicles to petroleum wellheads for the treatment and stimulation of production oil wells. The boom is mounted on a truck, trailer, or other suitable mobile transport, and the articulated pipe line which comprises a plurality of pipe sections interconnected by swivel joints to provide the required rotational freedom and flexibility, is suspended from the boom by trolleys to facilitate extension and retraction of the pipe line either independently of movement of the boom, or concurrently therewith.

20 Claims, 12 Drawing Figures

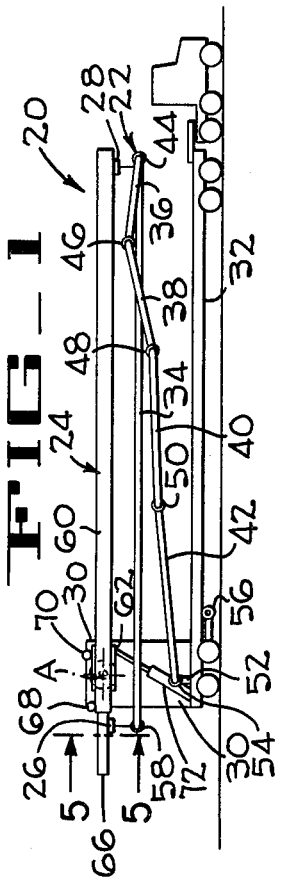
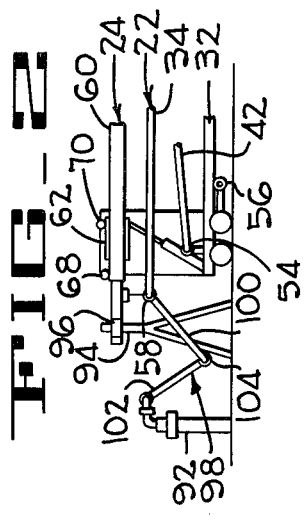
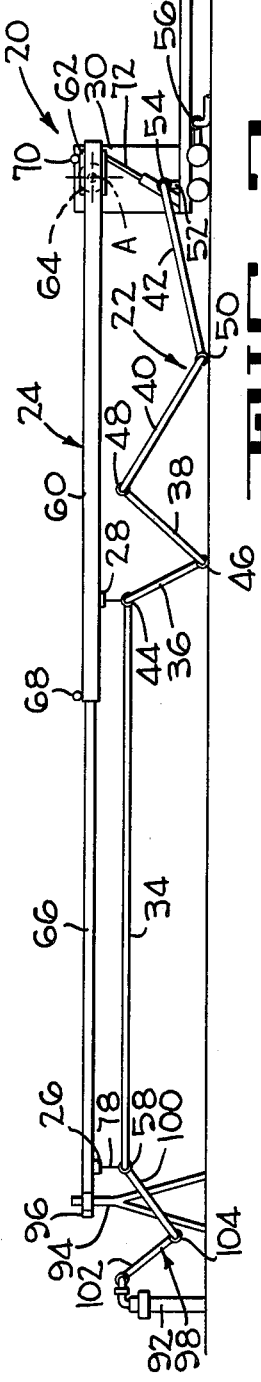
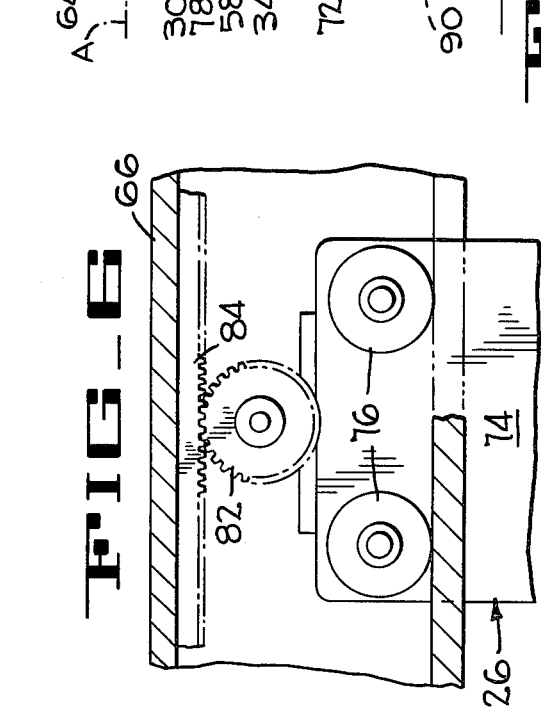
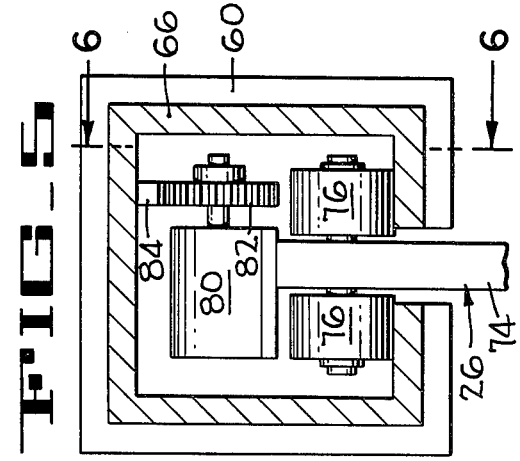

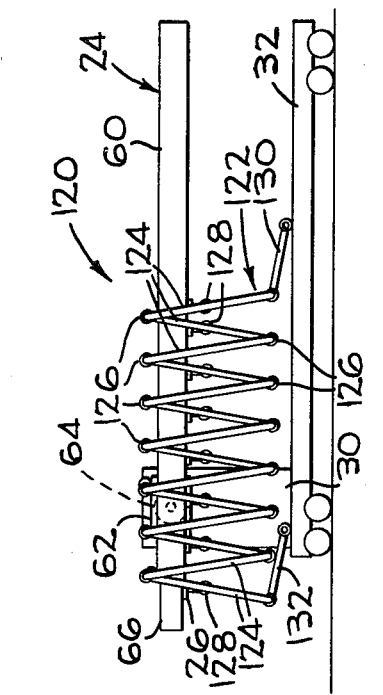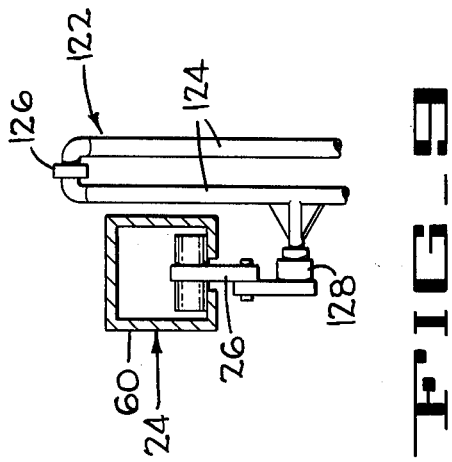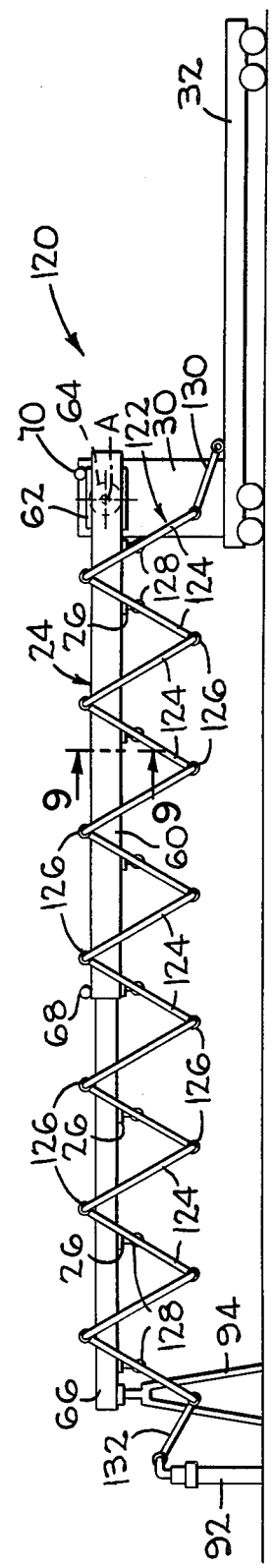

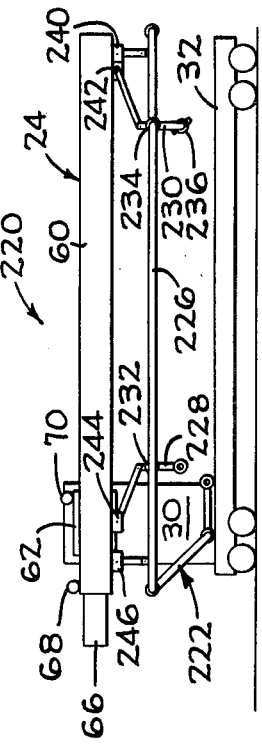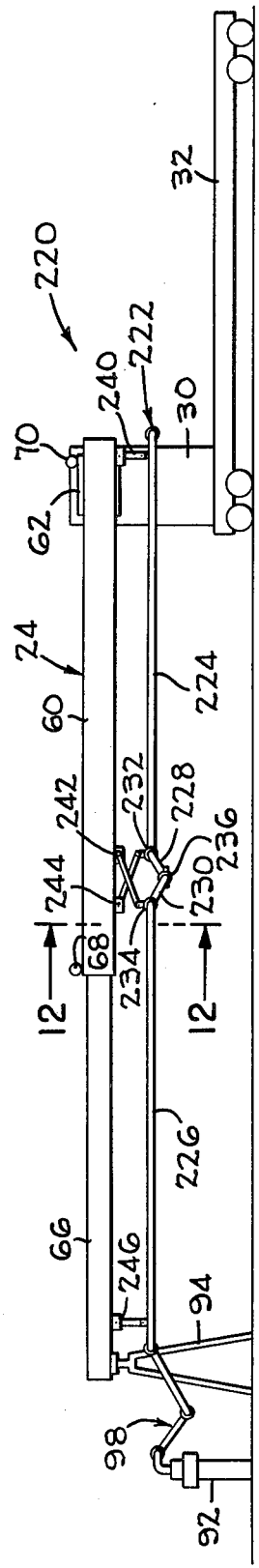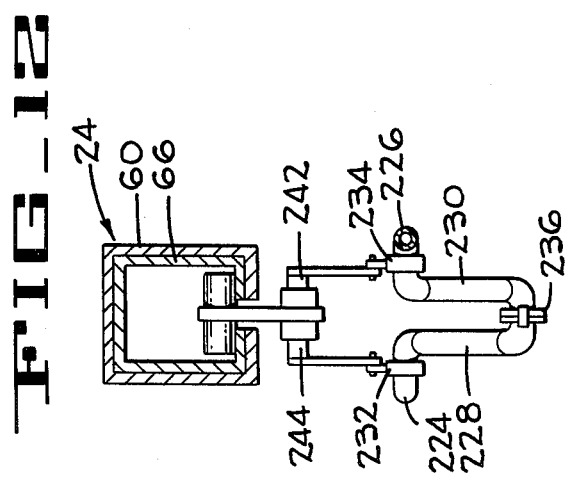

MONO-RAIL BOOM SUPPORTED ARTICULATED SERVICE LINE

BACKGROUND OF THE INVENTION

FIELD OF THE INVENTION

This invention relates to well servicing equipment, and more particularly to apparatus for conducting pressurized fluids from a service vehicle to a wellhead.

During the course of producing fluids from a petroleum well it often becomes desirable or necessary to subject the well to a treatment procedure in order to stimulate its fluid production. That procedure usually involves the injection of a fluid under high pressure, such as 20,000 psi., to fracture the producing earth formation, or the injection of an acid solution to dissolve or otherwise remove flow obstructing material, thereby increasing the flow of petroleum from the formation into the well. In order to carry out these well stimulation procedures, it is commonplace to employ an articulate pipe assembly, called a service line, to conduct the fluid from a mobile pumping unit to the wellhead. Such a service line usually comprises a plurality of straight lengths of rigid pipe interconnected end-to-end by pipe swivel joints, and sufficient pipe unions to facilitate disassembly into sections that can be handled manually.

Although this type of service line is functionally satisfactory, there are disadvantages associated with its installation and removal. For example, the procedure generally employed is to transport the disassembled line by truck or other vehicle to the well site and then manually unload the pipe sections, position them between the wellhead and the pumping unit, and interconnect them into a fluid-tight conduit. Each of these steps takes significant time and requires trained personnel, both of which are costly. When pipe of larger than normal diameter, and thus of greater weight, is used in order to increase the volume of fluid injected into the well in a given time period, or to reduce the time for injecting a given fluid volume, additional personnel and/or time are required. In either case the procedure is not as efficient as desired.

Various ways to overcome these disadvantages have been proposed, including the use of telescoping and other types of cranes with single or double booms to assist in handling the pipe sections. However, considerable side load tending to overturn the crane is encountered, due either to a small load at extreme horizontal distance or a large load at extreme vertical distance, thereby requiring the crane to possess an extremely heavy center of gravity, or necessitating the use of outriggers to widen the base and keep within decent engineering practices of loading. Both solutions are awkward in that they frequently exceed highway load limits on single wheel-single axle euipment, and sometimes even the bearing load of the earth over which the crane must travel to the well site. A further disadvantage of outriggers is that they inhibit the location and placement of pumper or feeder trucks at the well site. Resorting to separate tractors skip loaders, side boom loaders, and other such devices does not fully overcome these problems if, as is sometimes the case, impassable areas between these vehicles and the well site are encountered.

SUMMARY OF THE INVENTION

The present invention overcomes the foregoing and other disadvantages by providing an articulate well service pipe line releasably mounted on a mobile mono-rail boom assembly in such a manner that the boom assembly can be extended from its transport base to a portable support previously positioned closely adjacent the wellhead and the service line then extended along the mono-rail to the wellhead for connection thereto, all in a relatively easy, quick, efficient, and safe manner. The pipe sections of the service line are suspended from the mono-rail boom assembly by trolleys that can be individually operated to extend the service line from its stowed position to the wellhead or other target location and to retract the extended line back into that stowed position, without need for manual effort such as required by conventional service equipment. The trolleys are provided with means to disconnect the service line therefrom, and may include winches or other devices to lower the service line to the ground and raise it to the boom, if desired. Thus the line can be lowered into functional position on the ground, and the mono-rail boom assembly then retracted onto its transport and removed from the area, prior to commencing well injection, thereby eliminating the danger of damage to the boom assembly and its transport should a well blow-out or other catastrophe occur. Placing the service line in functional position on the ground also enables taking advantage of the ground-produced dampening effect on erratic movement of the line that occurs under extreme flow conditions, such as backflow from the well.

The mono-rail boom assembly is pivotally mounted on a turret for adjusting the elevation of the boom about a horizontal axis, and in the preferred embodiment the turret is mounted on a flat-bed truck trailer which can be used as its own turntable to orient the boom towards the wellhead. A turntable between the turret and the trailer can be included for pivoting the boom about a vertical axis without need to maneuver the trailer from its desired parked position.

The mono-rail boom assembly can include two or more boom sections, and the sections can be interconnected in a telescoping or other manner that is compatible with the remaining elements of the apparatus and their intended use. With the boom assembly in its extended position and suitably supported at its tip, as by a portable tripod, the articulated service line imposes a dead-weight load on the boom, rather than a bending or overhung load as would be imposed on a crane and its support. Should the load on, and/or the deflection of, the boom increase to an undesirable quantity an auxiliary support can be included at the boom's mid-point, or of course at any other suitable location.

When the terrain between the wellhead and the parking site for the truck trailer or other transport vehicle is rough, the boom can be extended to the wellhead, its tip placed on an appropriate support, and the service line then extended into functional position. When that terrain will permit travel of the trailer to the wellhead, the trailer can be backed to the wellhead, the service line connected thereto and the tip of the mono-rail boom placed on its support, and the trailer then moved away, resulting in the mono-rail boom and the service line extending freely from the trailer as this movement occurs. The reverse of this procedure can be employed to retract the boom and service line into their stowed positions.

BRIEF DESCRIPTION OF THE DRAWINGS

FIG. 1 is a diagrammatic side elevation of a mono-rail boom supported articulate pipe well service line according to the present invention, showing the boom pivotally mounted on a pedestal at the rear end of a truck trailer and with the boom and the service line in their stowed positions.

FIG. 2 is a fragmentary view similar to FIG. 1, but showing the service line connected to a wellhead and the boom tip resting on a tripod support adjacent the wellhead.

FIG. 3 is a view like FIG. 1, showing the boom and service line extended from their truck trailer transport.

FIG. 4 is a rear end elevation on an enlarged scale, of the apparatus of FIG. 1.

FIG. 5 is an enlarged fragmentary cross section taken along the line 5—5 of FIG. 1, showing details of a service line trolley.

FIG. 6 is a view taken along the line 6—6 of FIG. 5.

FIG. 7 is a view like that of FIG. 1, illustrating another embodiment of the present invention.

FIG. 8 is a view like that of FIG. 3, showing the boom and service line of FIG. 7 in their extended positions.

FIG. 9 is an enlarged fragmentary view taken along the line 9—9 of FIG. 8.

FIG. 10 is a view like that of FIGS. 1 and 7, illustrating yet another embodiment of the present invention.

FIG. 11 is a view like that of FIGS. 3 and 8, showing the boom and service line of FIG. 7 in their extended positions.

FIG. 12 is an enlarged fragmentary view taken along the line 12—12 of FIG. 11.

DESCRIPTION OF THE PREFERRED EMBODIMENT

Referring to FIGS. 1-6, one embodiment 20 of the present invention comprises an articulated pipe well service line assembly 22 suspended from a mono-rail boom assembly 24 by a pair of trolleys 26,28, with the boom assembly 24 pivotally mounted on a turret 30 for elevational movement about a generally horizontal axis A, and with the turret mounted on the rear end of a truck trailer 32.

The service line assembly 22 comprises a relatively long rigid straight pipe section 34 suspended from the boom assembly 24 by means of the trolley 26 at its outer end and the trolley 28 at its inner end, a plurality of shorter rigid straight pipe sections 36,38,40,42, and a plurality of pipe swivel joints 44,46,48,50 interconnecting the pipe sections into a single, articulated, fluid-tight conduit. The inner end of the service line assembly 22 is pivotally connected to a manifold line 52 by a pipe swivel joint 54, and the other end of the manifold line terminates in a pipe flange or other device 56 suitable for connecting the service line to a source of pressurized fluid to be conducted by the line to a wellhead. The outer end of the service line assembly likewise terminates in a pipe flange or other suitable means 58 for connecting the line to a wellhead.

The mono-rail boom assembly 24 comprises a first boom section 60 slidably mounted in a bracket 62 that is secured to the turret 30 by a trunnion bearing assembly 64 (FIG. 4) or other suitable means to provide elevational movement of the boom assembly 24 about the axis A, and a second boom section 66 residing within the first boom section 60 and capable of being extended therefrom, and retracted thereinto, in a telescoping manner by a motorized gear system 68 or other suitable motive means mounted on the first boom section 60. In like manner, a motorized gear system or other motive device 70, mounted on the bracket 62, provides a means to extend and retract the first boom section 60 with respect to the turret 30. Accordingly, by proper operation of the gear motors 68,70, which of course cooperate with rack gears (not shown) on the boom sections, the boom assembly 24 can be extended and retracted with respect to the turret 30, and thus with respect to the trailer 32, as desired. Alternatively, extension and retraction of the boom sections can be performed manually, or by suitable hydraulic or sheave and cable assemblies (not shown), or combinations thereof, as desired.

Exemplary of one means for the purpose, an hydraulic piston and cylinder assembly 72, the cylinder pivotally mounted on the turret 30 and the piston rod connected to the bracket 62, functions to elevate and lower the boom assembly 24 about the axis A. Other means for this function can be employed if desired.

As shown in FIGS. 4-6, the trolley 26 comprises a generally vertically oriented bracket 74 supported by rollers or wheels 76 on the inside of the second boom section 66 for longitudinal movement with respect thereto, and a detachable link or other suitable support element 78 to interconnect the trolley bracket 74 and the pipe section 34 in a releasable manner, thereby facilitating disconnecting the pipe section 34 from the trolley 26, and thus from the boom section 66, as desired. The trolley 26 can be arranged for free movement along the boom section 66, or if desired it can be provided with a gear motor 80 and a pinion gear 82 for cooperation with a gear rack 84, fixed to the inside of the boom section 66, to facilitate controlled movement of the trolley by hydraulic, electric, or other suitable power.

The trolley 28 preferably is essentially identical to the trolley 26, and thus the foregoing description applies to it as well. Of course, if additional trolleys are desired, they can be included.

Should it be desirable to lower the service line assembly 22 to the ground, and/or to lift it from the ground into position for reconnecting it to the trolleys, a hand winch or come-along (neither shown) can be attached between the trolleys and the service line. If remote control of the lowering and/or lifting operation is desired, a winch (not shown) can be located on the trailer 32, with cables (not shown) extending therefrom to snatch blocks (not shown) at the trolleys. Alternatively, hydraulic motors (not shown) can be used to drive the winches, either locally at the trolleys or remotely from the trailer.

One of the advantages of the present invention is that the truck trailer 32 can serve as its own turntable to align the boom assembly 24 towards the wellhead or other target in preparation for connecting the service line 22 thereto. However, if desired, the turret 30 can be mounted on a turntable 90 (FIG. 4) that is secured to the trailer 32, and suitable power (not shown) for rotating that turntable can be included.

Extension of the boom assembly 24 and the service line 22 from their stowed positions (FIG. 1) to their extended positions (FIG. 3) for connecting the service line to a wellhead 92 can be accomplished by first extending the boom assembly, as by operation of the gear motors 68,70, to a location adjacent the wellhead and then positioning a tripod or other suitable support structure 94 in supporting position with respect to a boom assembly tip 96. The pipe section 34 is then moved along the boom assembly, as by operation of the trolley motors 80, until the terminal flange or other connection device 58 is in position to be connected to the wellhead by a pipe/swivel joint jumper assembly 98, shown as comprising two straight pipe sections 100,102 interconnected by a pipe swivel joint 104. Alternatively, and as represented in FIG. 2, the trailer 32 can be backed up to the wellhead 92, the support 94 installed under the boom tip 96, the jumper assembly connected to the wellhead and the pipe section 34, and the trailer moved away from the wellhead while the boom assembly and the service line are held stationary, thereby ultimately resulting in their extended positions as illustrated in FIG. 3. The reverse of this procedure can be employed to replace the boom assembly and the service line into their stowed positions (FIG. 1).

It should be understood that a single mono-rail boom section, or an assembly of three or more boom sections can be used in accordance with this invention in lieu of a dual section assembly as illustrated, and that auxiliary supports (not shown) for the boom assembly, such as one beneath its mid-point, can be installed as desired.

EMBODIMENT OF FIGS. 7–9

The second embodiment 120 of the present invention illustrated in FIGS. 7-9 is a modified version of the first embodiment 20 of FIGS. 1-6 described above, and where the elements are essentially the same they have been designated by the same numbers.

The principle differences in the second embodiment 120 are the service line assembly 122 and the manner in which it is suspended from the mono-rail boom assembly 24. The service line assembly 122 comprises a plurality of substantially equal length pipe sections 124 interconnected in an end-to-end manner by a plurality of pipe swivel joints 126. The service line assembly 122 is pivotally and releasably connected by a rotary bearing 128 (FIG. 9) to a plurality of trolleys 26 (shown without a gear motor) that are movable along the boom sections 60,66 as in the first embodiment. The inner and outer ends of the service line may include suitable jumper/pipe swivel assemblies 130,132 to facilitate connecting the line to a source of pressurized fluid, and to a wellhead 92, respectively.

As shown in FIG. 7, the service line assembly 122 can be stowed in a more compact, accordion-like manner that the assembly 22 of the first embodiment, which may be advantageous in circumstances where, for example, it is desired to reduce the load imposed on the forward end of the boom assembly 24 when in its stowed position.

EMBODIMENT OF FIGS. 10–12

The third embodiment 220 of the present invention illustrated in FIGS. 10-12 is yet another modification of the first embodiment of FIGS. 1-6, and again where the elements are essentially the same they have been designated by the same numbers.

In this third embodiment 220 the service line assembly 222 comprises two relatively long, straight and rigid pipe sections 224,226 (FIG. 11) interconnected pivotally by a pair of short rigid pipe sections 228,230 and pipe swivel joints 232,234 and a pipe union 236. The service line assembly 222 is releasably suspended from the mono-rail boom assembly 24 by trolleys 240,242,244 and 246 generally of the same type shown in FIGS. 5 and 9, whereby the service line is movable longitudinally with respect to the boom assembly as in the foregoing first and second embodiments.

In the stowed position of the service line assembly 222 (FIG. 10), the pipe sections 224,226 reside in a side-by-side parallel manner and, of course, are not connected at the pipe union 236. When the service line has been extended into its functional position (FIG. 11) the pipe union 236 is assembled to interconnect the pipe sections 224,226 in a fluid-tight manner. The pipe union is readily and quickly disconnected prepatory to retracting the service line 222 into its stowed position.

As shown in FIGS. 10-12, the trolley 242 is pivotally connected to the front end of the pipe section 226, and trolley 244 is likewise connected to the rear end of the pipe section 224. Thus neither trolley presents an obstruction to the other as the service line is extended and retracted.

Although the best mode contemplated for carrying out the present invention has been herein shown and described, it will be apparent that modification and variation may be made without departing from what is regarded to be the subject matter of the invention.

I claim:

1. A mono-rail boom supported articulated well service line for use in well service operations to interconnect a supply of pressurized fluid to a wellhead, comprising:
   an extendible mono-rail boom having a plurality of boom sections with an inboard boom section mounted on a mobile transport means and with the other boom sections extendible outward from said inboard boom sections;
   means for supporting an outer portion of said boom when said boom is in an extended position;
   an articulated pipe well service line;
   a plurality of trolleys mounted for relative independent movement along the length of said boom with the movement of said trolleys independent of the extendible movement of said boom sections;
   means for connecting said service line to said trolleys for movement of said service line between a retracted position and an extended position when said boom is in an extended position; and
   means for disconnecting said service line from said trolleys for supporting said service line on the ground when said service line is at least partially extended.

2. An apparatus according to claim 1 wherein each of said trolleys includes power means for moving said trolley along the boom.

3. An apparatus according to claim 1 wherein the rigid pipe sections are connected together in end-to-end fashion by pipe swivel joints, thereby defining an accordion-like pipe conduit assembly.

4. An apparatus according to claim 1 including means to readily connect and disconnect the service line to and from a wellhead.

5. An apparatus according to claim 1 including means to readily connect and disconnect the service line to and from a supply of pressurized fluid.

6. An apparatus according to claim 1 including power means functionally engaging the boom for extending and retracting the boom from a stowed position.

7. An apparatus according to claim 1 including pivot means between the boom and the transport means to facilitate elevating and lowering said boom about a generally horizontal axis.

8. An apparatus according to claim 1 including pivot means between the boom and the transport means to facilitate pivotal movement of said boom with respect to said transport means about a generally vertical axis.

9. An apparatus according to claim 1 wherein the service line comprises a plurality of substantially equal length rigid pipe sections interconnected by pipe swivel joints in an end-to-end manner.

10. A mono-rail boom supported articulated well service line for use in well service operations to interconnect a supply of pressurized fluid to a wellhead, comprising:
 an extendible mono-rail boom having a plurality of boom sections with an inboard boom section mounted on a mobile transport means and with the other boom sections extendable outward from said inboard boom section;
 means for supporting an outer portion of said boom when said boom is in an extended position;
 an articulated pipe well service line including a plurality of long pipe sections each substantially the same length as a corresponding one of the boom sections, and a plurality of shorter pipe sections pivotally interconnecting said long pipe sections;
 a plurality of trolleys mounted for movement along the length of said boom;
 means for connecting said service line to said trolleys for movement of said service line between a retracted position and an extended position when said boom is in an extended position; and
 means for disconnecting said service line from said trolleys for supporting said service line on the ground when said service line is at least partially extended.

11. An apparatus according to claim 10 wherein each of said trolleys includes power means for moving said trolley along the boom.

12. An apparatus according to claim 10 wherein the rigid pipe sections are connected together in end-to-end fashion by pipe swivel joints, thereby defining an accordion-like pipe conduit assembly.

13. An apparatus according to claim 10 including means to readily connect and disconnect the service line to and from a wellhead.

14. An apparatus according to claim 10 including means to readily connect and disconnect the service line to and from a supply of pressurized fluid.

15. An apparatus according to claim 10 including power means functionally engaging the boom for extending and retracting the boom from a stowed position.

16. A mono-rail boom supported articulated well service line for use in well service operations to interconnect a supply of pressurized fluid to a wellhead, comprising:
 an extendible mono-rail boom having a plurality of boom sections with an inboard boom section mounted on a mobile transport means and with the other boom sections extendible outward from said inboard boom section;
 means selectively connected between ground and said boom for supporting an outer portion of said boom when said boom is in an extended position;
 an articulated pipe well service line;
 a plurality of trolleys mounted for movement along the length of said boom;
 means for connecting said service line to said trolleys for movement of said service line between a retracted position and an extended position when said boom is in an extended position; and
 means for disconnecting said service line from said trolleys for supporting said service line on the ground when said service line is at least partially extended.

17. An apparatus according to claim 16 including power means functionally engaging the boom for extending and retracting the boom from a stowed position.

18. An apparatus according to claim 16 including pivot means between the boom and the transport means to facilitate elevating and lowering said boom about a generally horizontal axis.

19. An apparatus according to claim 16 including pivot means between the boom and the transport means to facilitate pivotal movement of said boom with respect to said transport means about a generally vertical axis.

20. An apparatus according to claim 16 wherein the service line comprises a plurality of substantially equal length rigid pipe sections interconnected by pipe swivel joints in an end-to-end manner.

* * * * *